United States Patent [19]
Ichimura et al.

[11] Patent Number: 5,970,039
[45] Date of Patent: Oct. 19, 1999

[54] OPTICAL RECORDING MEDIUM, METHOD OF RECORDING INFORMATION, METHOD OF REPRODUCING INFORMATION, APPARATUS FOR RECORDING INFORMATION, AND APPARATUS FOR REPRODUCING INFORMATION

[75] Inventors: Kouichi Ichimura; Kazushige Yamamoto; Nobuhiro Gemma, all of Yokohama, Japan

[73] Assignee: Kabushiki Kaisha Toshiba, Kawasaki, Japan

[21] Appl. No.: 09/039,636

[22] Filed: Mar. 16, 1998

[30] Foreign Application Priority Data

Mar. 18, 1997 [JP] Japan ................................. 9-064645

[51] Int. Cl.$^6$ ............................................. G11B 7/00
[52] U.S. Cl. ........................ 369/116; 369/100; 369/288; 369/272
[58] Field of Search .................................. 369/100, 272, 369/288, 116, 284, 275.2, 44.37; 359/326, 330

[56] References Cited

U.S. PATENT DOCUMENTS

| | | | |
|---|---|---|---|
| 5,256,849 | 10/1993 | Scully | 219/121.68 |
| 5,754,511 | 5/1998 | Gemma et al. | 369/100 |
| 5,771,117 | 6/1998 | Harris et al. | 359/326 |

OTHER PUBLICATIONS

O. Schmidt et al.; "Steep Dispersion and Group Velocity Below c/3000 in Coherent population Trapping", Physical Review A, vol. 53, No. 1, pp. R27–R30, Jan. 1996.

*Primary Examiner*—John W. Cabeca
*Assistant Examiner*—Kim-Kwok Chu
*Attorney, Agent, or Firm*—Finnegan, Henderson, Farabow, Garrett & Dunner, L.L.P.

[57] ABSTRACT

A method of recording information in an optical recording medium, which comprises two steps. In the first step, a coherent light pulse train which resonates with a transition between the first and third energy levels and coherent light which resonates with a transition between the second and third energy levels or a transition between the first and second energy levels are applied to the optical recording medium, thereby causing the light pulse train to pass through the optical recording medium. In the second step, an intensity change of an external field is supplied to the medium, while the light pulse train is passing through the optical recording medium, thereby fixing sites in a thickness direction of the medium, at which the absorption spectrum of the medium is changed.

22 Claims, 12 Drawing Sheets

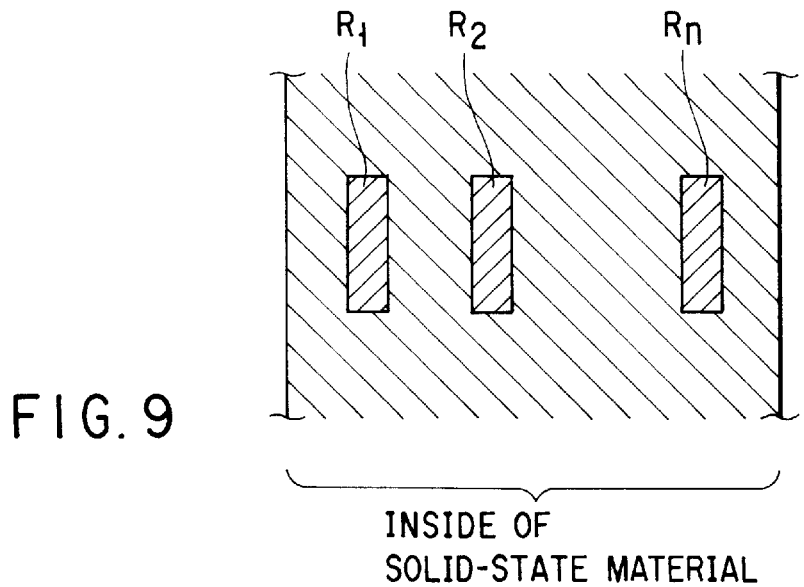
F I G. 9
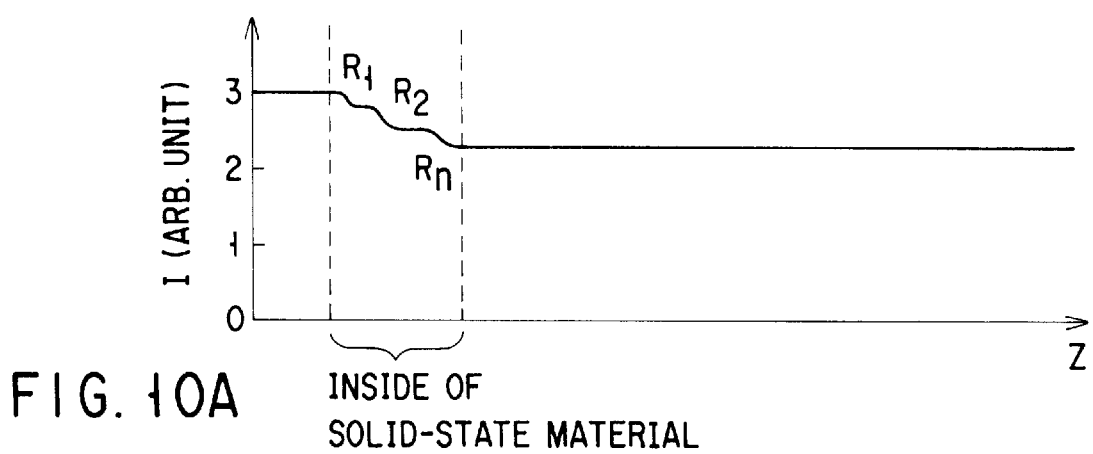
F I G. 10A
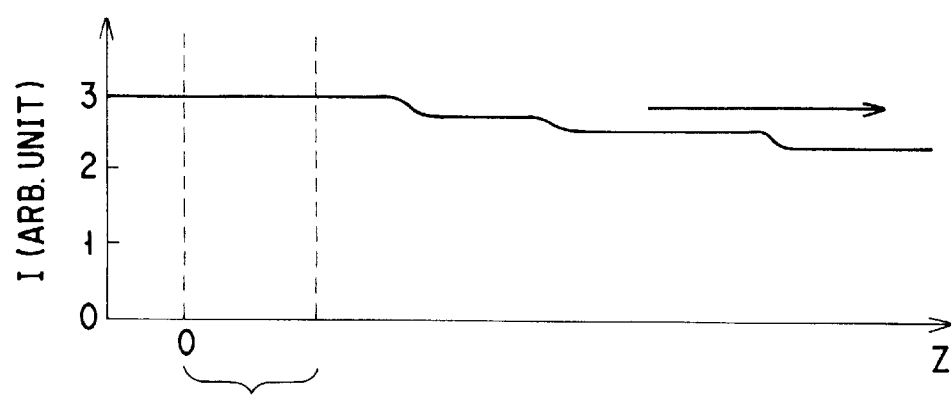
F I G. 10B

POSITION IN SOLID-STATE MATERIAL (mm)

OPTICAL RECORDING MEDIUM, METHOD OF RECORDING INFORMATION, METHOD OF REPRODUCING INFORMATION, APPARATUS FOR RECORDING INFORMATION, AND APPARATUS FOR REPRODUCING INFORMATION

BACKGROUND OF THE INVENTION

The present invention relates an optical recording medium, a method of recording information, a method of reproducing information, an apparatus for recording information, and an apparatus for reproducing information.

On the conventional optical recording medium, information is recorded in a two-dimensional fashion, that is, in a data-recording surface. It is proposed that information be recorded not only in the data-recording surface but also in the thickness direction of the medium at a density similar to the in-plane recording density. In other words, bits of information should be recorded in the thickness direction, at intervals as short as the wavelength of the light beam applied to record the information. If this is achieved, the recording capacity of the medium will increase remarkably.

Kawada, Microoptics News, Vol. 14, No. 1 (1996) discloses a method of recording information in the thickness direction of a medium. In this method, a lens is driven, moving the focal point in the depth direction of the medium, thereby recording information bits at positions in the medium which are aligned in the depth direction. The method can record information in the thickness direction, at a density of about 30 bits for 0.3 mm.

Each information bit is recorded by virtue of the absorption of light occurring at the point where the light beam is focused by moving the lens. The efficiency of light absorption and the distance the lens is moved limit the thickness of that part of the medium which serves the depth-direction recording. Further, the speed of recording information cannot be increased so much since the lens must be moved to record information bits in the depth direction of the medium.

No conventional method is available that is relatively simple and can yet record information bits in the thickness direction of a medium at a density substantially equal to the reciprocal of the wavelength of the light beam applied to the medium. Moreover, no conventional method can record information in the depth direction of a medium at a sufficiently high speed.

BRIEF SUMMARY OF THE INVENTION

The object of the present invention is to provide a method of recording information in an optical recording medium, at a high density also in the thickness direction of the medium, a method of reproducing information recorded in the optical recording medium, in the thickness direction thereof, an apparatus for recording information in the optical recording medium, and an apparatus for reproducing information recorded in the optical recording medium.

An optical recording medium according to this invention is made of a solid-state material having three energy levels in which the lowest energy level is referred to as a first energy level and the other energy levels are referred to as a second and a third energy level, the material undergoes a change in absorption spectrum when irradiated with light which resonates with a transition between the first and the third energy levels, and retains the change in absorption spectrum after irradiation of the light is stopped.

According to the invention, a method is provided which is designed to record information in the optical recording medium described above. The method comprises the steps of: applying to the optical recording medium a coherent light pulse train which resonates with a transition between the first and third energy levels and coherent light which resonates with a transition between the second and third energy levels or a transition between the first and second energy levels, thereby causing the light pulse train to pass through the optical recording medium; and supplying an intensity change of an external field to the optical recording medium, while the light pulse train is passing through the optical recording medium, thereby fixing sites in the thickness direction of the medium, at which the absorption spectrum is changed.

Further, according to the invention there is provided a method of reproducing information from the optical recording medium described above. The method comprises the steps of: supplying an intensity change of an external field to the optical recording medium, while light which resonates with a transition between a fourth energy level and a fifth energy level, the fourth and fifth energy levels being respectively initial state and final state of a transition caused by light absorption occurring at a position of the optical recording medium, where the absorption spectrum has changed; and detecting changes in the intensity of light emerging from the optical recording medium after the intensity of the external field has been changed, thereby reproducing the information from the optical recording medium.

Still further, according to the invention there is provided a information recording apparatus comprising: first means for holding the optical recording medium described above; second means for applying to the optical recording medium a coherent light pulse train which resonates with a transition between the first and third energy levels; third means for applying to the optical recording medium coherent light which resonates with a transition between the second and third energy levels or a transition between the first and second energy levels; and fourth means for applying an external field having a controlled intensity to the optical recording medium.

Moreover, according to the invention there is provide a information reproducing apparatus which comprises: first means for holding the optical recording medium described above; second means for applying to the optical recording medium light which resonates with a transition between fourth and fifth energy levels; third means for applying an external field having a controlled intensity to the optical recording medium; and fourth means for detecting changes in an intensity of light emerging from the optical recording medium, the changes occurring as the intensity of the external field varies with time.

To reproduce the information in the form of a pulse train, this information reproducing apparatus needs to have means for detecting a time derivative of the intensity of light which emerges from the medium while the external field applied to the medium is changed in tensity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a diagram showing the positions in the solid-state material, where the absorption spectrum changes;

FIG. 10A is a graph illustrating the spatial distribution of light intensity observed in the recorded solid-state material when reproduction light is applied to the material;

FIG. 10B is a graph depicting the spatial distribution of the intensity of light passed through the solid-state material after an external filed has been applied to the material;

DETAILED DESCRIPTION OF THE INVENTION

Figure 1:
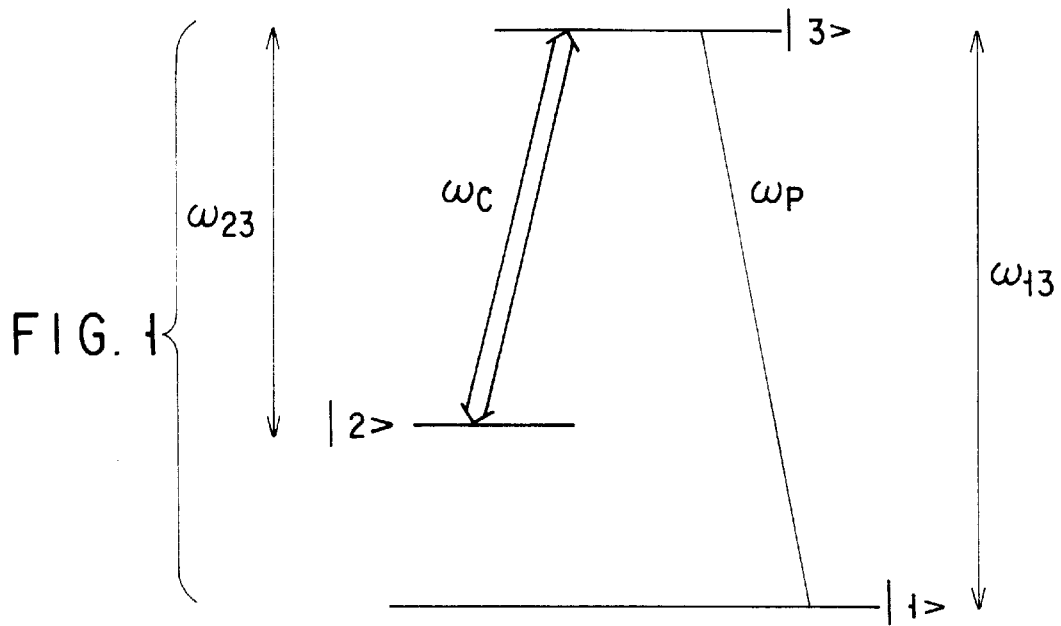
FIG. 1 is a diagram illustrating the relation among the energy level of a solid-state material, the photon energy of coupling light and the photon energy of probe light.

The present invention will be described in detail.

An optical recording medium according to this invention is made of a solid-state material having a specific property described below. Here, assume that the solid-state material has three energy levels in which the lowest energy level is referred to as a first energy level and the other energy levels are referred to as a second and a third energy levels. The solid-state material undergoes a change in absorption spectrum when it is irradiated with light that resonates with a transition between the first energy level and the third energy level. The material retains the change of absorption spectrum even after the application of light to it has been stopped.

At first, a method of recording information in the optical recording medium of the invention will be explained briefly.

In the recording method according to the invention, two coherent light beams are simultaneously applied to the above-mentioned optical recording medium.. The first light beam is a coherent light pulse train having such an angular frequency that it resonates with a transition between the first and the third energy levels. The second light beam is coherent light has such an angular frequency that it resonates with a transition between the second and third energy levels or a transition between the first and second energy levels. Information is superposed on the light pulse train, which is used as recording light.

When the two light beams are applied to the optical recording medium, the medium absorbs no light at all due to quantum interference effect. This phenomenon is known as EIT (Electromagnetically Induced Transparency). When this phenomenon takes place, the solid-state material becomes transparent to the light pulse train, allowing the light pulse train to pass through it. While EIT is occurring, the refractive index of the material greatly depends on the angular frequency. The dispersion curve of the solid-state material therefore inclines greatly. As a result, the group velocity of the light pulses in the material decreases, whereby the light pulse train is spatially compressed in the solid-state material. The compression of the light pulse train contributes to an increase in the recording density of the optical recording medium.

An intensity change of an external field (an electric field or a magnetic field, or both) is given to the medium while the light pulse train is passing through the medium. In this case, a light pulse train and coupling light may be applied to the optical recording medium without applying any external field thereto, and an external field may then be applied to the medium while the light pulse train is passing through the medium. Alternatively, a light pulse train and coupling light are applied to the medium along with an external field having a specific intensity, and the intensity of the external field may be changed while the light pulse train is passing through the medium. As a result, the energy levels of the solid-state material shift to other energies, thus no EIT occurs. The material that has been transparent to the light pulse train therefore becomes opaque. Hence, the light pulse train propagating in the solid-state material is absorbed in the material the moment the external field changes in intensity.

As indicated above, the solid-state material of the optical recording medium according to the invention has its absorption changed when it absorbs light that resonates with a transition between the first and third energy levels, and retains the change of its absorption spectrum even after the application of light to it has been stopped. The light pulses can therefore be, as it were, fixed (or "printed") at the positions they take in the thickness direction of the medium at the time the intensity of the field changes.

In the recording method according to the invention, transparency (vanishing of absorption) and decrease in the group velocity of light pulses due to increase in the inclination of the dispersion curve of the material are used as described above. These phenomena will be described in greater detail, to facilitate the understanding of the recording method of the invention.

Let us at first look at one atom, ion or molecule (hereinafter referred to as "absorption center") which is a unit absorbing light in the solid-state material, without considering, for the sake of simplicity, the inhomogeneous broadening of the material.

The solid-state material has three energy levels, a first level of the lowest energy level $|1\rangle$ and the other two levels, i.e., a second level $|2\rangle$, and a third level $|3\rangle$ as is illustrated in FIG. 1. In this figure, the level $|1\rangle$ is a ground level, and the level $|3\rangle$ is higher than the level $|2\rangle$ in energy. (The level $|1\rangle$ may be an energy level the material has when excited with light to have a certain occupation number, not the ground state. The level $|2\rangle$ may be higher than the level $|3\rangle$.) The angular frequency corresponding to the transition between the levels $|m\rangle$ and $|n\rangle$ (m, n=1, 2, 3) at the i-th absorption center in the solid-state material is denoted as $\omega_{mn}(i)$.

Assume coherent light that resonates with the transition between the energy levels $|2\rangle$ and $|3\rangle$ is applied to the solid-state material. Hereinafter, the coherent light will be called "coupling light," and will be considered to have an angular frequency $\omega_C$. (Instead, coupling light which resonates with the transition between the energy levels $|1\rangle$ and $|2\rangle$ may be applied to the material.) At the same time, coherent light which resonates with the transition between the energy levels $|1\rangle$ and $|3\rangle$ is applied to the solid-state material. Hereinafter, this coherent light will be called "probe light," and will be considered to have an angular frequency $\omega_p$.

The absorption spectrum of the i-th absorption center is observed when the probe light is applied to the solid-state material. The absorption spectrum has a hole, where light absorption disappears under a condition that the difference between $\omega_{13}(i)$ and $\omega_p$, i.e., $\omega_p-\omega_{13}(i)$, is equal to the difference between $\omega_{23}(i)$ and $\omega_C$, i.e., $\omega_C-\omega_{23}(i)$. Hence, no excitation occurs at the absorption center at the energy level $|1\rangle$ in spite of the probe light being applied to the solid-state material.

There is a specific range of angular frequency in which light absorption disappears. This range is determined by Rabi's characteristic angular frequencies $\Omega_C(i)$ of the coupling light and $\Omega_p(i)$ of the probe light, both for the ith absorption center. More specifically, when coupling light fixed at an angular frequency $\omega_p$ is applied to the i-th absorption center, absorption of light does not occur if the angular frequency $\omega_p$ falls within the range defined as follows:

$$\omega_{13}(i) - \omega_{23}(i) + \omega_C - (\Omega_C(i)^2 + \Omega_p(i)^2)^{1/2}/2 < \qquad (1)$$
$$\omega_p < \omega_{13}(i) - \omega_{23}(i) + \omega_C + (\Omega_C(i)^2 + \Omega_p(i)^2)^{1/2}/2$$

Figure 2:
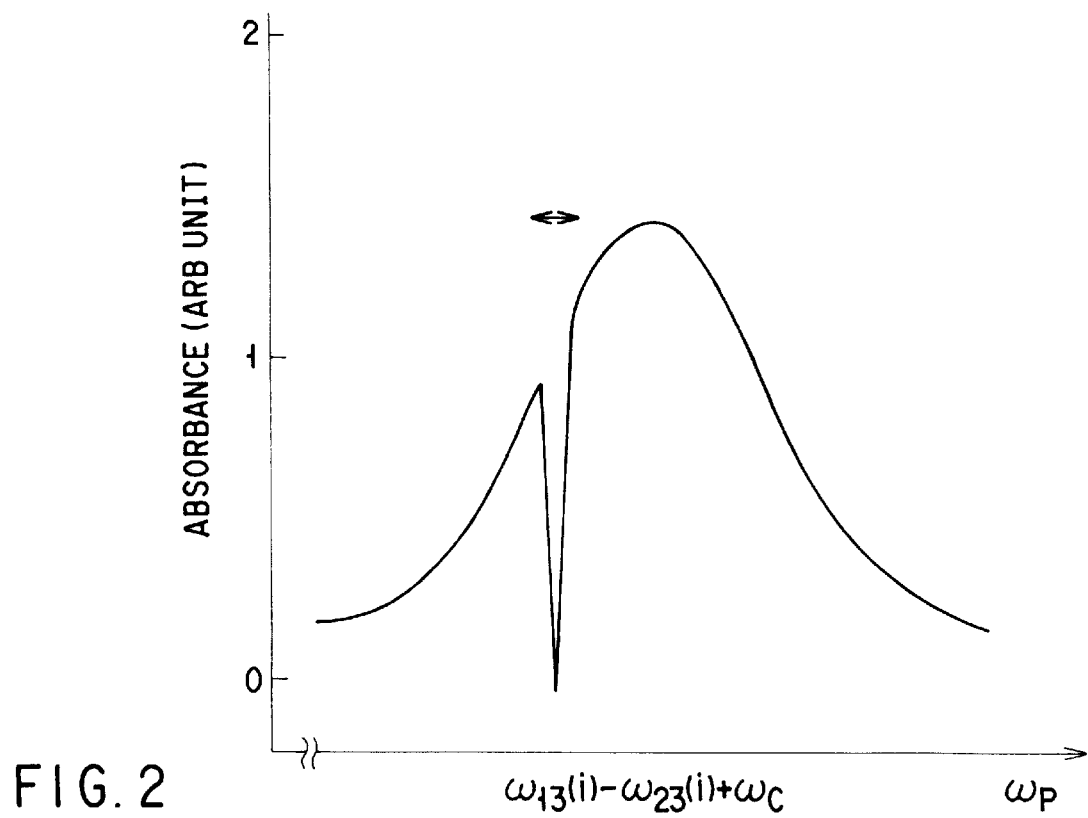
FIG. 2 is a graph explaining the position and width of a transparent region in an absorption spectrum, which has resulted from EIT.

FIG. 2 shows the absorption spectrum which is observed when probe light is applied to the solid-state material, along with coupling light. As seen from FIG. 2, the spectrum has a transparent region at the position of angular frequency of $\omega_{13}(i)-\omega_{23}(i)+\omega_C$. The transparent region has a width which is given as $(\Omega_C(i)^2+\Omega_p(i)^2)^{1/2}$.

In the condition represented by the equation (1), the absorption center stays in a state of superposition expressed by the following equation (2). The state is known as "population trapping state."

$$|->_1 = \frac{(\Omega_C(i)|1> - \Omega_p(i)|2>)}{(\Omega_C(i)^2 + \Omega_p(i)^2)^{1/2}} \qquad (2)$$

Figure 3:
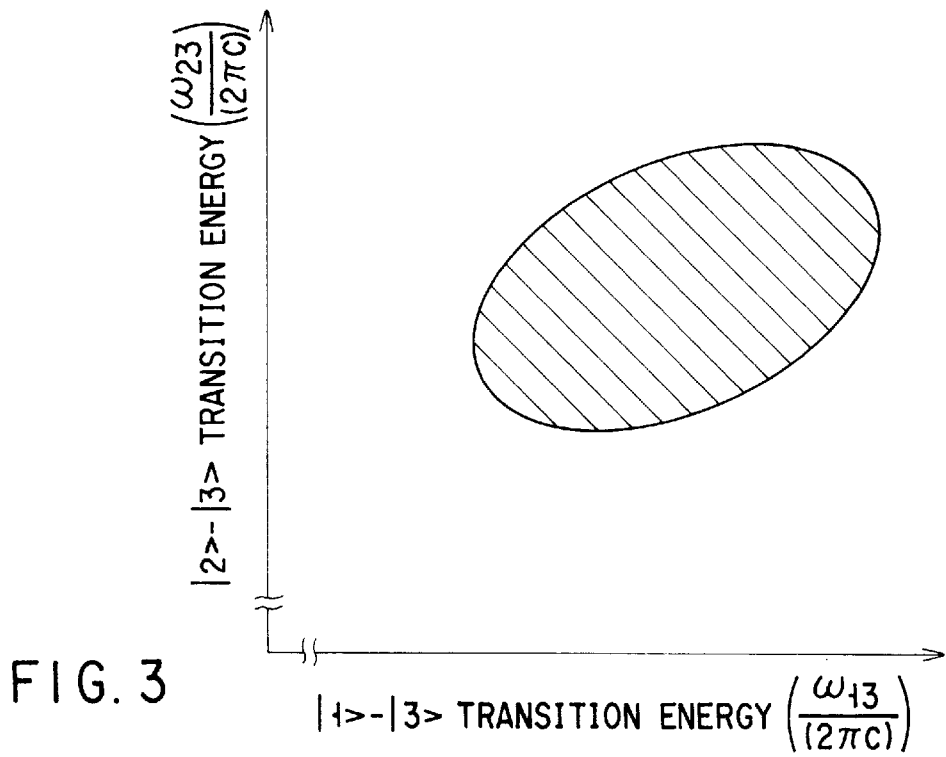
FIG. 3 is a schematic graph showing the distribution of the transition energy of a solid-state material.

Let us discuss an actual solid-state material which exhibits inhomogeneous broadening in transition angular frequencies. A solid-state material in which transition angular frequency is distributed in the $\omega_{13}-\omega_{23}$ plane as is illustrated in FIG. 3 shall be studied at first. Shown in FIG. 3 is only the region where the density of transition angular frequency is about a half or more of the maximum density. When both coupling light and probe light are applied to this solid-state material, population trapping occurs in that region of the $\omega_{13}-\omega_{23}$ plane which extend along a straight line represented by the following equation (3):

$$\omega_{23}=\omega_{13}-\omega_p+\omega_C \qquad (3)$$

Assume that neither $\Omega_C(i)$ nor $\Omega_p(i)$ greatly depends on the i-th absorption center, and therefore, conditions of $\Omega_C(i)=\Omega_C$ and $\Omega_p(i)=\Omega_p$ are satisfied. Further, assume that the line widths of the coupling light beam and probe light beam are much less than the homogeneous broadening for the transition between the energy levels $|1\rangle$ and $|3\rangle$ and than the homogeneous broadening for the transition between the energy levels $|2\rangle$ and $|3\rangle$, respectively. Still further, let us assume that $\Omega_C$ is much greater than $\Omega_p$. In this case, population trapping takes place in the region illustrated in FIG. 4. This region has a width X measured along the straight line defined by the equation (3). The width X is given as $(\Omega_C^2+\Omega_p^2)^{+e,fra\ 12+ee}/(2\pi c) \approx \Omega_C/(2\pi c)$. The absorption center in this region is in the state of:

$$|->_1 = \frac{(\Omega_C(i)|1> - \Omega_p(i)|2>)}{((\Omega_C(i))^2 + (\Omega_p(i))^2)^{1/2}} \approx |1>$$

Figure 4:
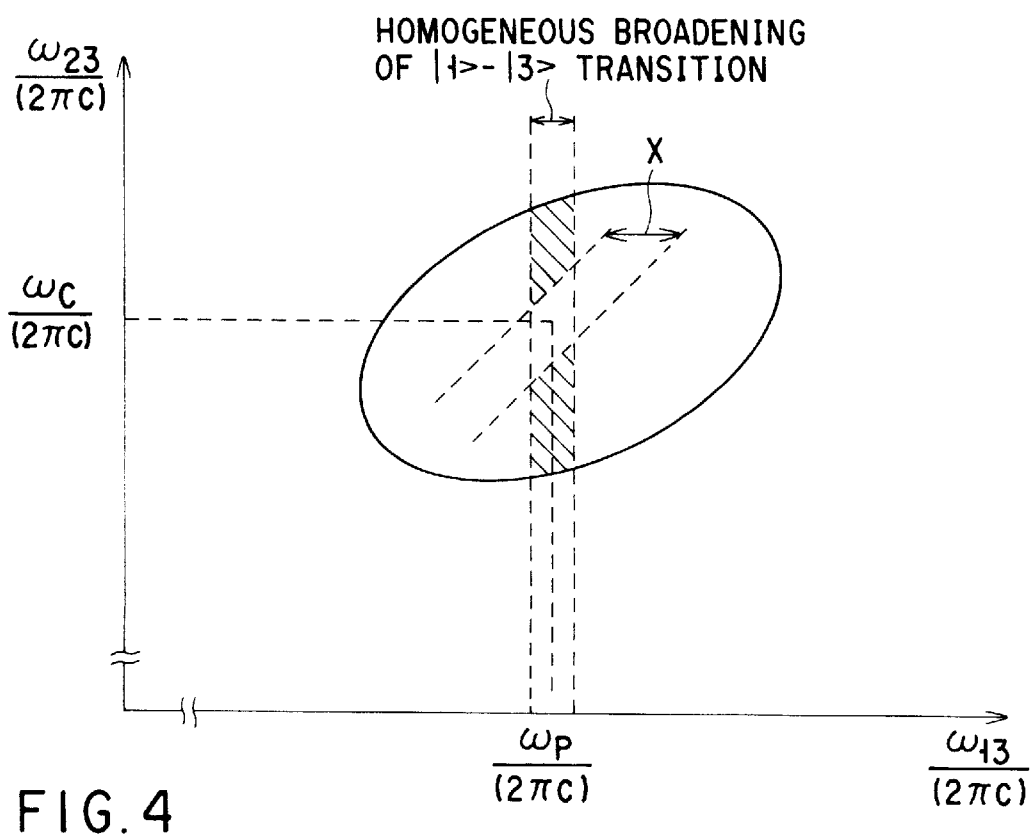
FIG. 4 is a graph illustrating a region in which population trapping occurs in a transition energy plane and a region in which the probe light undergoes resonation.

However, no disappearance of absorption is observed if the distribution of absorption centers in the $\omega_{13}-\omega_{23}$ plane, which causes the inhomogeneous broadening for each transition, has the relationship shown in FIG. 4 with the region where population trapping takes place. This is because the solid-state material has a number of absorption centers that resonate with the probe light but do not assume the state of population trapping.

Figure 5A:
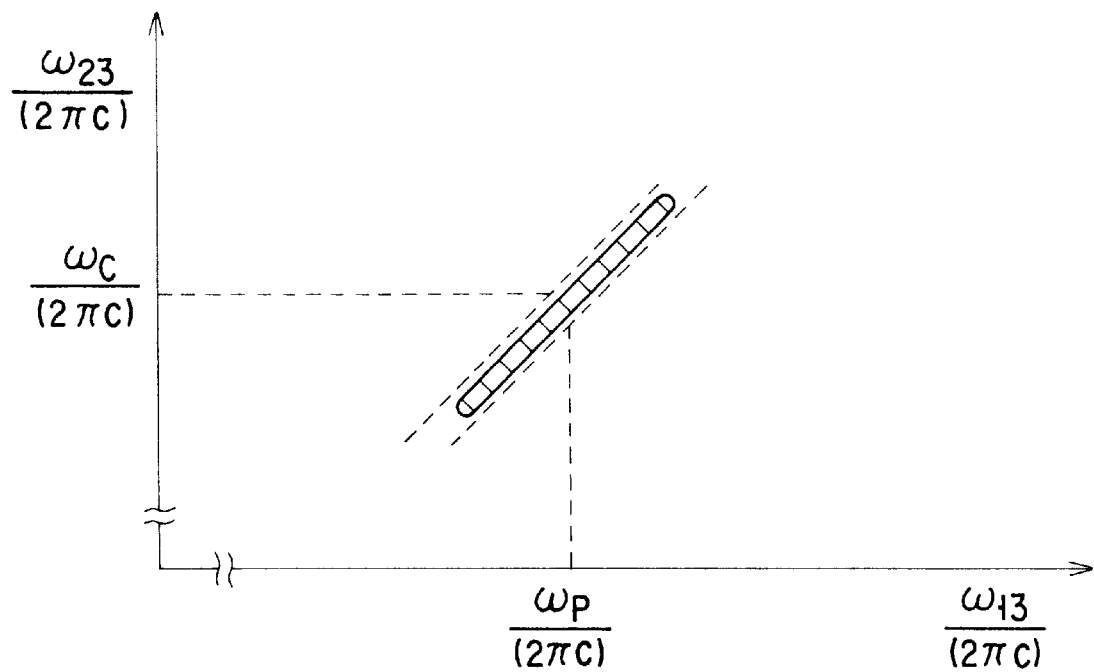
FIGS. 5A and 5B are graphs showing the relation between the distribution of transition energy and the population trapping region, both pertaining to a solid-state material used as the material of a recording medium according to the present invention.
Figure 5B:
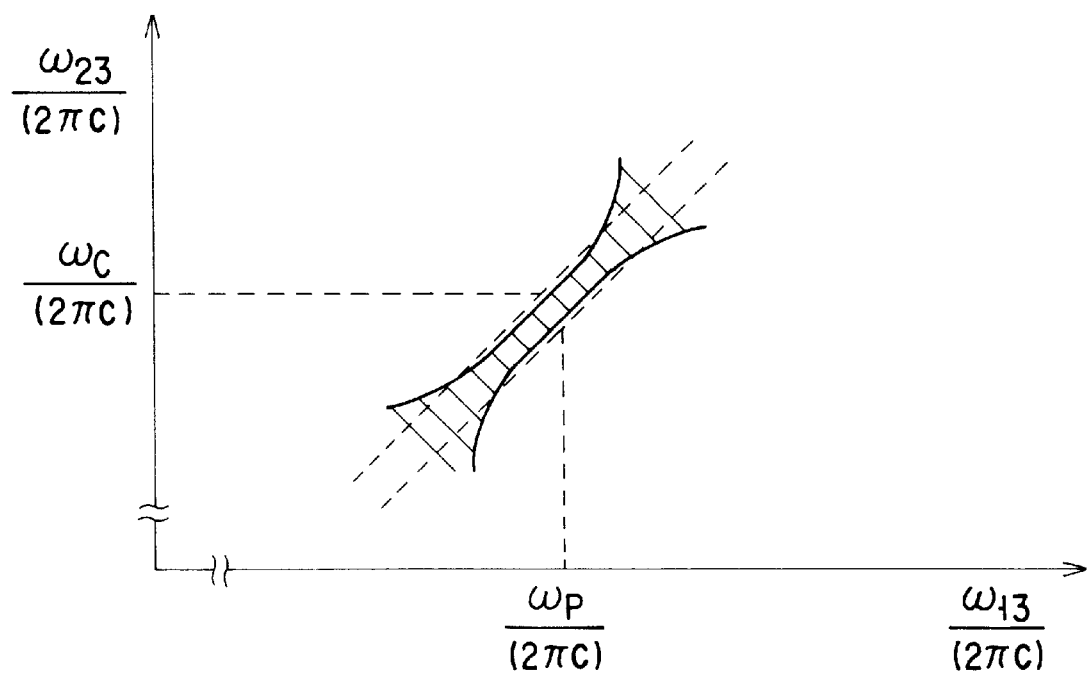

The present invention uses solid-state material in which absorption centers are distributed in the population trapping region in a plane cut off by lines perpendicular to the axis of $\omega_{13}$ In other words, the invention utilizes solid-state material in which disappearance of absorption is observed. Further, the present invention uses solid-state material having such a distribution that there exist absorption centers which does not take place population trapping but resonates with the probe light when the energy levels shift due to a change in the intensity of the external field applied to the material. FIGS. 5A and 5B depict the distributions of absorption centers that meet above conditions.

Figure 6A:
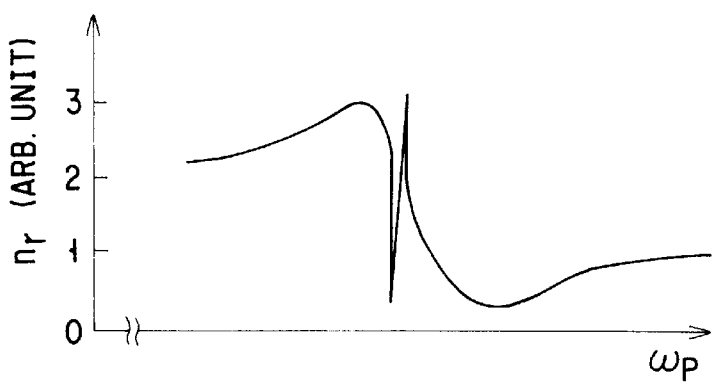
FIGS. 6A and 6B are graphs showing the dispersion relation and the absorption spectrum, which are observed when EIT occurs in the solid-state material.
Figure 6B:
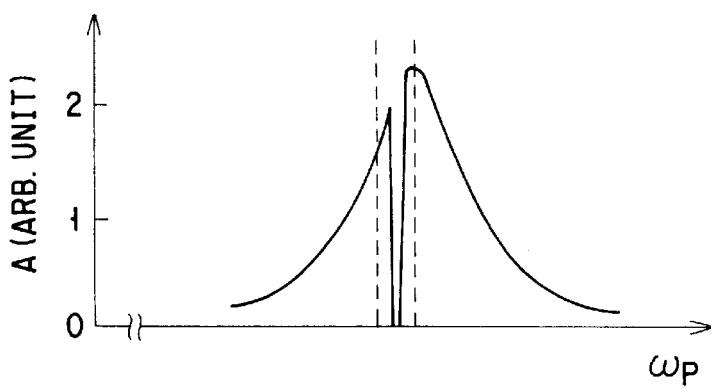
Figure 6C:
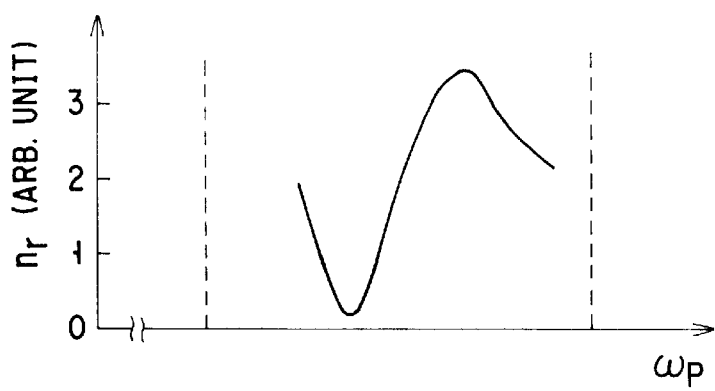
FIGS. 6C and 6D are magnified views of the parts of FIGS. 6A and 6B.
Figure 6D:
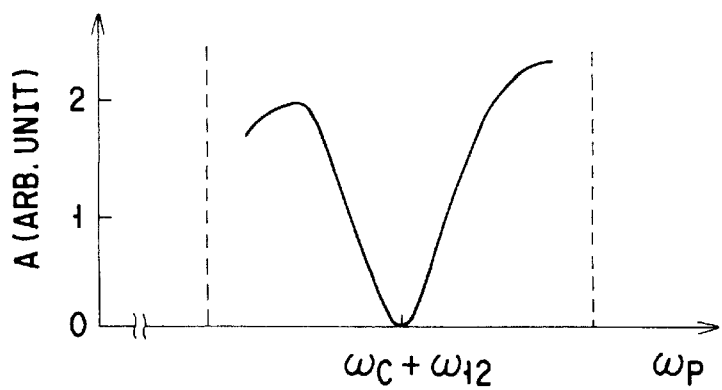

It will be explained dispersion in solid-state material while coupling light is applied to the material. FIG. 6A shows how the real part $n_r$ of the complex refractive index which the material exhibits while coupling light is applied to it depends on the angular frequency of the probe light also being applied to the material. FIG. 6B shows how the absorbance (A) of the material depends on the angular frequency of the probe light. FIG. 6C is a magnified view of the angular frequency region shown in FIG. 6A, in which disappearance of absorption occurs due to EIT. FIG. 6D is a magnified view of the angular frequency region shown in FIG. 6B, in which disappearance of absorption occurs due to EIT. As seen from FIG. 6C, the real part $n_r$ grealy changes when the angular frequency $\omega_p$ of the probe light is nearly equal to $\omega_C + \omega_{12}$ where absorption disappears.

Group velocity $V_g$, which is propagation volocity of light pulses propagates, is given as follows:

$$V_g = (c/n)\{1 - (\omega/n)(dn_r/d\omega)\} \quad (4)$$

where $dn_r/d\omega$ is the slope of the real part $n_r$.

As the equation (4) indicates, the greater the slope of real part $n_r$, the less the group velocity $V_g$, and therefore the more slowly the light pluses propagates through the solid-state material. It is reported that in a gas system, for example, the group velocity is 1/3000 of its value in a vacuum, at a angular frequency which causes EIT (see O. Schmidt et al., Physical Review A, Vol. 53, No. 1, 1996).

Figure 7A:
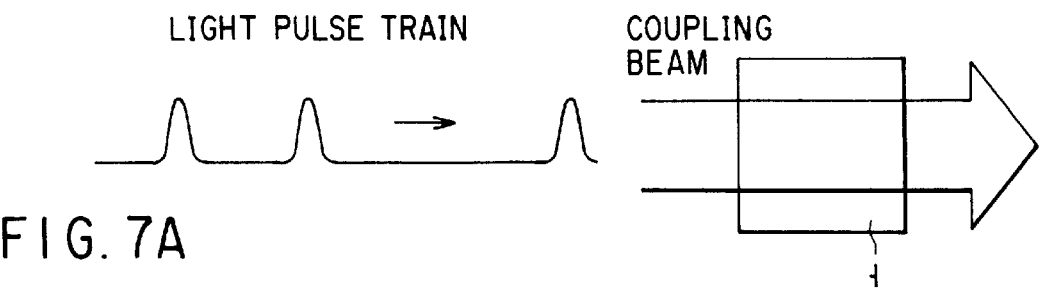
FIGS. 7A and 7B are diagrams explaining how a light pulse train enters the solid-state material and compressed therein while coupling light is applied to the material.
Figure 7B:
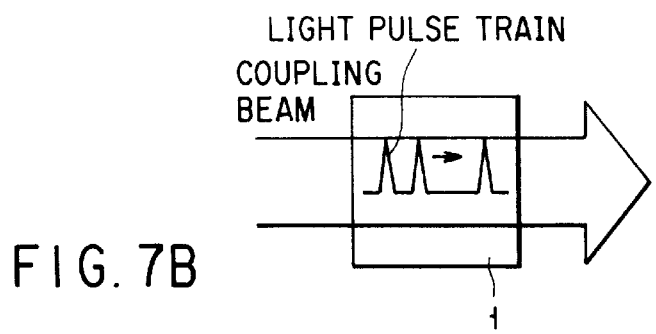

In the present invention, coupling light is applied to solid-state material having such a dispersion relation as shown in FIGS. 6A to 6D. Further, a light pulse train (probe light) composed of light pulses having an angular frequency ($\omega_p$ nearly equal to $\omega_C + \omega_{12}$, where disappearance of absorption is observed in the spectrum, is applied to the material. FIGS. 7A and 7B illustrate how the coupling light and the probe light are applied to the solid-state material. The solid-state material is transparent to light having angular frequency $\omega_p$, or scarcely absorbs this light. The light pulse train therefore passes through the solid-state material. Since $dn_r/d\omega$ is large at this angular frequency $\omega_p$, the group velocity of the light pulse train passing through the material decreases in accordance with the equation (4). The intervals between the light pulses decrease proportionally. That is, the light pulse train is compressed.

Figure 8A:
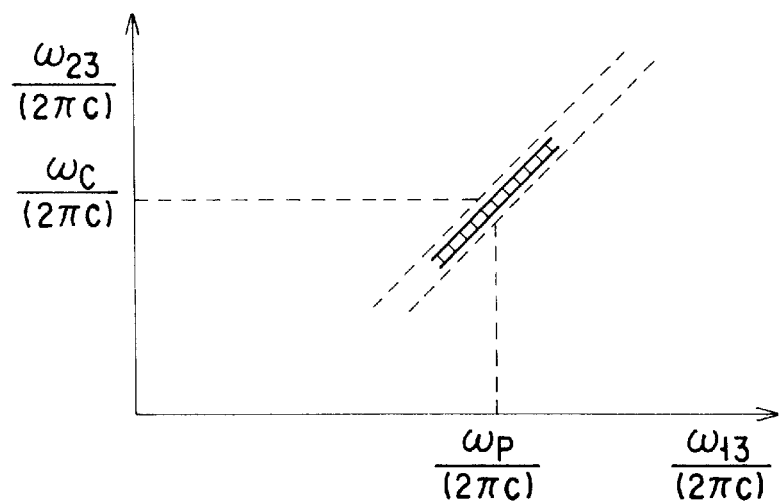
FIGS. 8A and 8B are graphs illustrating how the absorption changes in the solid-state material when an external field is applied to the material.
Figure 8B:
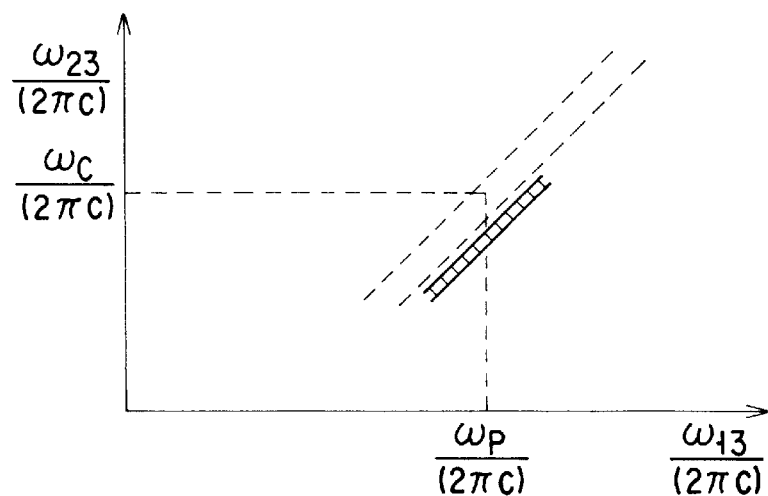

In the present invention, an intensity change of the external field (e.g., electric field or magnetic field) is supplied to the solid-state material while the light pulse train is passing through the material. As a result, the energy levels of the solid-state material shift to other energies, as is illustrated in FIGS. 8A and 8B. As the energy levels of the material shift from the energies shown in FIG. 8A, the probe light is absorbed in the material (see FIG. 8B). At the time an external field is applied to the material, the light in the material is absorbed at the positions where the light pulses have reached.

As mentioned above, the optical recording medium of the present invention is made of solid-state material in which absorption spectrum of any absorption center changes when it is excited to energy level |3>. Note that, the cause of the change in absorption spectrum depends on the type of solid-state material. In some cases, it may be caused by a change of the energy level structure. In other cases, it may be caused by a change in the occupation number of each energy level. Hence, light pulse train can therefore be "printed" (or fixed) in the material, at the positions where the absorption spectrum has changed. FIG. 9 illustrates a state that light pulse train is fixed as the sites $R_1, R_2, \ldots R_n$ where the absorption spectrum changes. Thus, information can be recorded in the form of light pulses, in the thickness direction of the solid-state material.

A method of reproducing light pulse train thus recorded in the solid-state material will be described. As indicated above, new light absorption occurs due to changes in the energy level structure or become prominent due to changes in the occupation number of each energy level, at the sites $R_1, R_2, \ldots R_n$ where the absorption spectrum has changed in the solid-state material in which recording (or "printing") has been performed. To reproduce the light pulse train in the present invention, reproduction light is applied to the optical recording medium. The reproduction light resonates with a transition caused by light absorption in a new absorption band which has been created by information recording or in an absorption band in which absorbance has increased. Hereinafter, the initial state of transition shall be called fourth level, and the final state of transition shall be called fifth level. Also, the angular frequency of the reproduction light that resonates with the transition between the fourth and fifth levels shall be referred to as $\omega_{45}$.

FIG. 10A shows the relationship between the positions where light pulses are recorded in the solid-state material and the intensity (I) of the reproduction light applied at that position. In FIG. 10A, the abscissa (z axis) represents the thickness direction of the recording medium. The graph of FIG. 10A pertains to the case in which a new absorption band is created and absorption of the reproduction light having angular frequency $\omega_{45}$ has changed from zero to a finite value. The light is gradually absorbed at the printed sites. Therefore, the intensity of light gradually decreases from the light-input surface toward the light-output surface, step by step whenever the reproduction light passes the printed sites.

In the reproducing method, according to the invention, an intensity change of an external field (e.g., electric field or magnetic field) is given to the solid-state material. For example, an external field of a prescribed intensity is applied to the optical recording medium, along with reproduction light is applied to the medium, and then the intensity of the external field is changed. Alternatively, reproduction light may first be applied to the optical recording medium without external field, and an external field may then be applied to the medium. The above transition angular frequency $\omega_{45}$ resonates with the transition energy between the forth level as an initial state and the fifth level an a final state, which correspond to the states in the case where the external field is applied or it is not applied, respectively.

It will now be explained how reproduction is performed by first applying no external field to the material and then applying an external field thereto, while reproduction light is applied.

When an external field is applied to the solid-state material staying in the condition of FIG. 10A, the energy levels shift at any sites where light absorption has occurred. The position of the resonance absorption for the reproduction light having angular frequency $\omega_{45}$ also shifts. In this condition, the absorption centers contributing to the absorption resonating with the reproduction light are distributed in only a part of the $\omega_{13}$–$\omega_{23}$ plane. The inhomogeneous broadening of the absorption resonating with the reproduction light is therefore narrowed as in most cases. The absorption band can be moved for a distance equal to or longer than the inhomogeneous broadening by applying an external field to the solid-state material. This dissipates (or greatly reduces) light absorption at the printed sites. As a result, the solid-state material becomes transparent to the reproduction light (or comes to absorb a very small part of the light). The light emerges from the solid-state material, with retaining its intensity distribution in the material, as illustrated in FIG. 10B. The time-dependency of the light passing through the material reflects a pattern in which the light pulses are printed in the solid-state material at the time when the intensity of the external field is changed.

Figure 11A:
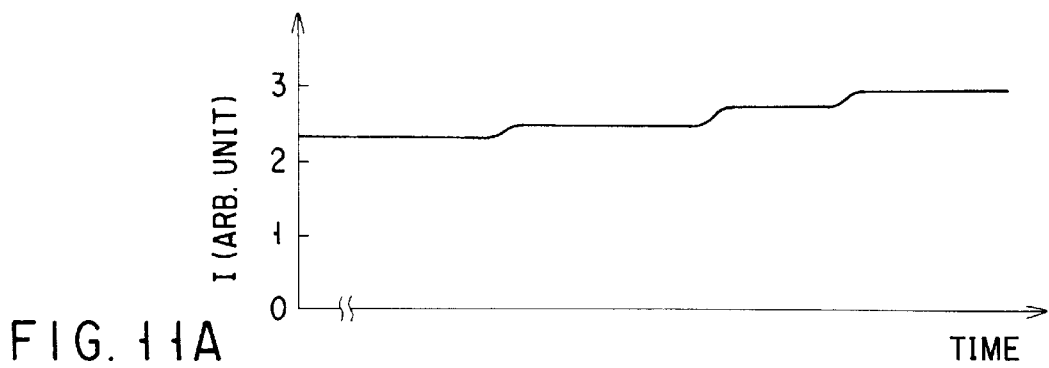
FIG. 11A is a graph showing how the intensity of light passed through the solid-state material varies with time.
Figure 11B:
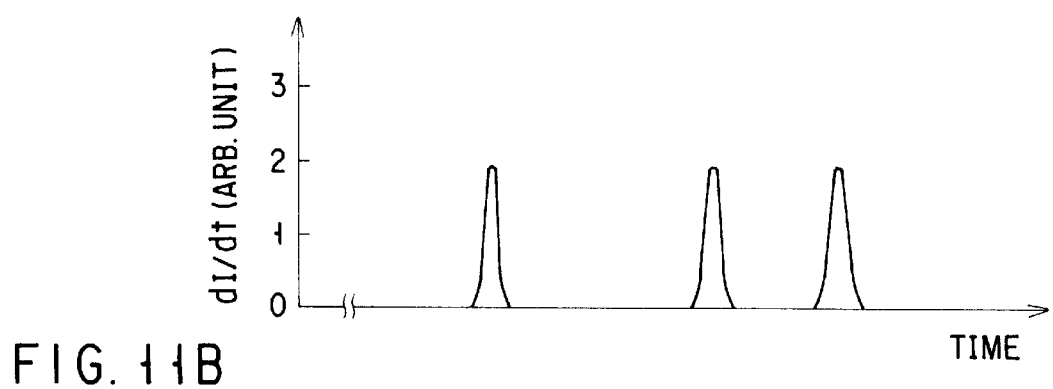
FIG. 11B is a graph illustrating the time derivative of the intensity of light passed through the solid-state material.

Hence, the information recorded in the solid-state material can be read out by detecting how the intensity of the light emerging from the material change with time as shown in FIG. 11A. The information can be reproduced in the form of pulse train by obtaining the time derivative of the intensity of the light passing through the material (dI/dt).

As indicated above, the present invention uses EIT to record information in the optical recording medium, in the thickness direction thereof. When EIT occurs, the inclination of the dispersion curve of the material increases, thereby reducing the group velocity of light pulses, which realizes recording at high spatial density. In addition, a group of light pulses can be recorded in the material at the same time, enhancing the recording speed. Moreover, it is easy to reproduce the information thus recorded in the solid-state material.

Coupling light which resonates with a transition between the energy levels |1> and |2> may be used in the present invention. If this is the case, the angular frequency $\omega_{23}$ is replaced by the angular frequency $\omega_{12}$, and the transition between the energy levels |2> and |13> is replaced by the transition between the energy levels |1> and |2>. In this case, the level |3> may be lower than the level |2>. In the present invention, the energy level |3> may be higher than the energy level |2> even when coupling light resonating with the transition between levels |2> and |3>. If so, it suffices to replace the angular frequency $\omega_{23}$ described above with an angular frequency $-\omega_{23}$.

EXAMPLES

Some examples of the present invention will be described, with reference to the accompanying drawings.

Example 1

In Example 1 of the invention, an optical medium is used which comprises a matrix made of $Y_3Al_5O_{12}$(YAG) crystal and $Pr^{3+}$ ions dispersed in the matrix in a concentration of 0.1%. The concentration of the $Pr^{3+}$ ions is the ratio at which the $Pr^{3+}$ ions substituted the $y^{3+}$ ions in the matrix.

Figure 12:
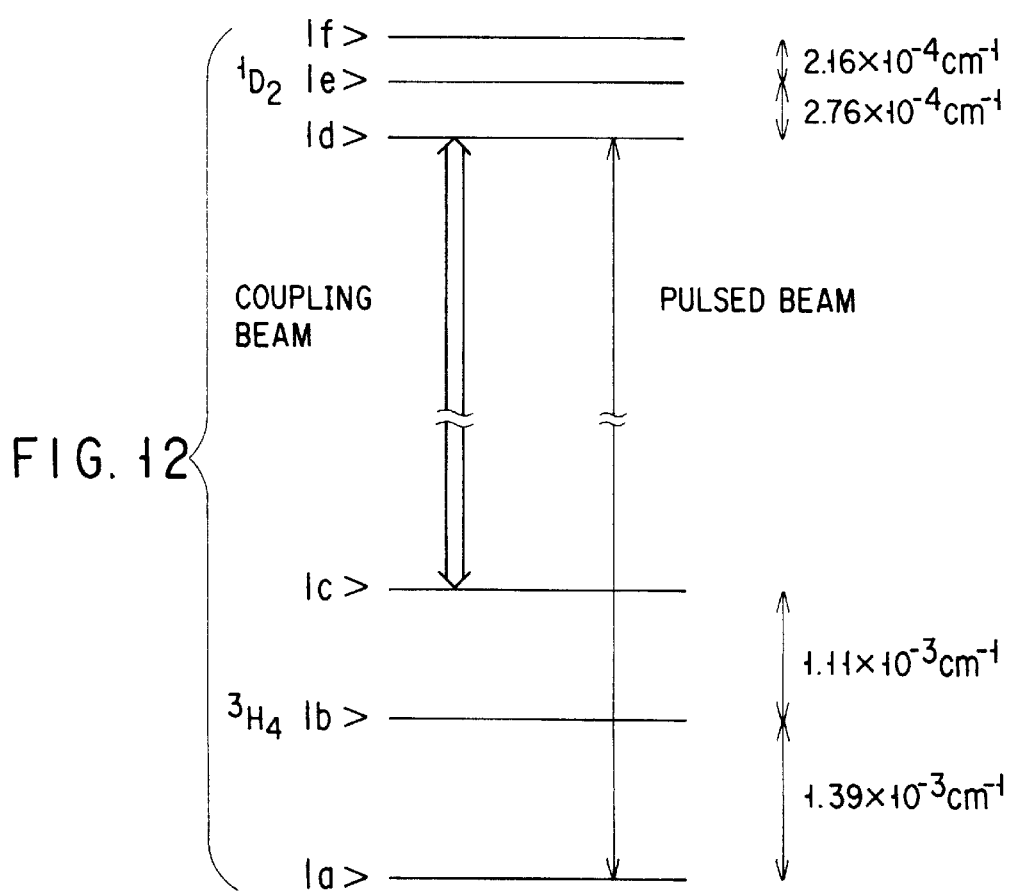
FIG. 12 is a diagram depicting the relation among the energy level of the solid-state material used in Example 1 of the invention, the photon energy of coupling light and the photon energy of probe light.

FIG. 12 shows the relation among the energy level structure of the $Pr^{3+}$ ion present in the solid-state material, the photon energy of the coupling light applied to the optical recording medium and the photon energy of the light pulse train applied to the medium and representing information to be recorded on the medium. FIG. 12 illustrates only the energy levels that pertain to Example 1. More precisely, it depicts three levels |a>, |b> and |c> which belong to $^3H_4$ level, which constitute a hyperfine structure and which become higher in this order. FIG. 12 also shows three levels |d>, |e> and |f> which belong to $^1D_2$ level, which constitute a hyperfine structure and which become higher in this order. FIG. 12 further shows the energy levels of those absorption centers, at which the coupling light resonates with the transition between the levels |c> and |d> and the pulse light resonates with the transition between the levels |a> and |d>, among the absorption centers of which energy levels are inhomogeneously distributed.

The inhomogeneous broadening of the transition between levels $^3H_4$ and $^1D_2$ is large, in the order of 1 cm$^{-1}$. Thus, there is an absorption center at which the coupling light and pulse light resonate with the transition between any one of the low levels |a>, |b> and |c> and any one of the high levels |d>, |e> and |f>. On the other hand, the inhomogeneous broadening of the transition between the levels belonging the $^3H_4$ level or $^1D_2$ level and constituting a hyperfine structure is small, in the order of $1 \times 10^{-5}$ cm$^{-1}$ or less.

Figure 13:
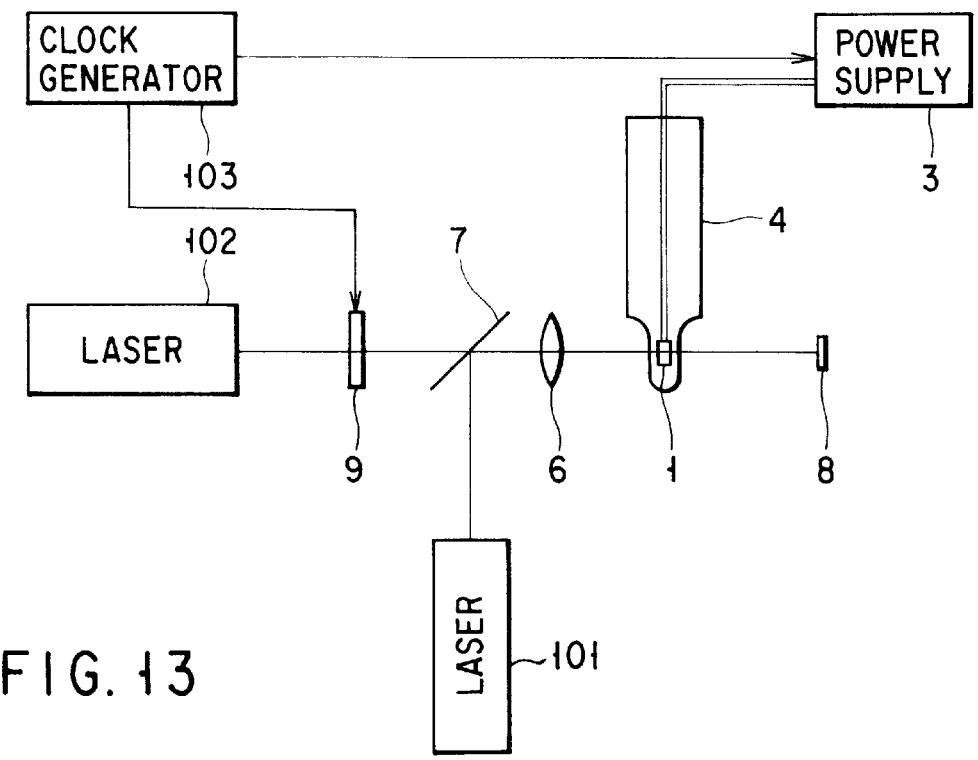
FIG. 13 is a block diagram showing the recording apparatus which is used in Example 1 of the present invention.
Figure 14:
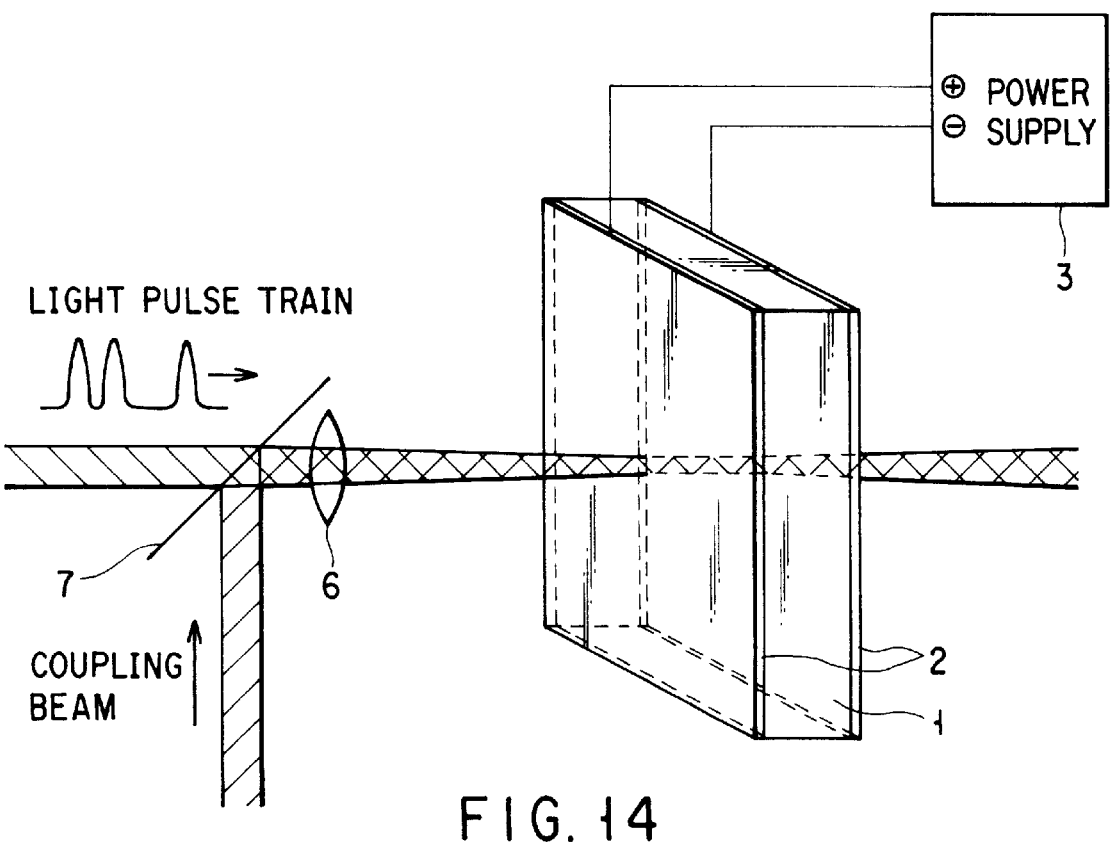
FIG. 14 is a magnified view of a part of FIG. 13.
Figure 15:
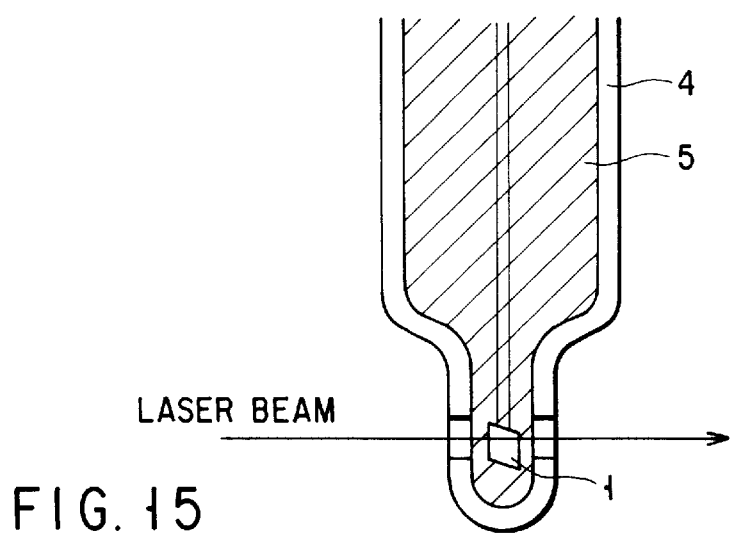
FIG. 15 is another magnified view of the part of FIG. 13.

An apparatus used in Example 1, for recording information, will be described with reference to FIGS. 13, 14 and 15. FIG. 13 shows the recording apparatus in its entirety. FIGS. 14 and 15 are magnified views of two parts of the apparatus.

The solid-state material 1 is a solid plate having a size of 20 mm×20 mm×7 mm. As seen from FIG. 14, an Al electrode 2 has been vapor-deposited on either surface of the material 1. Both Al electrodes 2 are thin enough to allow passage of coupling light and pulse light. The Al electrodes 2 are connected to a power supply 3, capable of high-speed switching which can apply an electric field of a desired intensity onto the solid-state material 1. The solid-state material 1 is held in a cryostat 4 which has a quartz window. The cryostat 4 is filled with liquid helium 5 having a reduced pressure, which cools the material 1 to 1.6 K.

As FIG. 13 shows, a CW ring dye laser excited by argon ion laser 101 is used as a source of coupling light. A laser beam emitted from the laser 101 is reflected by the halfmirror 7, is converged by the convex lens 6, and is applied to the solid-state material 1 held in the cryostat 4. A CW ring dye laser excited by argon ion laser 102 is used as a source of pulse light. A laser beam emitted from the laser 102 is passed through the electro-optical modulator 9 for generating pulsed light, which is passed through the half mirror 7, converged by the convex lens 6, and then is incident on the solid-state material 1 held in the cryostat 4. Thus, the coupling light and the pulse light are applied to the material 1, substantially in parallel to each other. A beam stopper 8 is provided outside the cryostat 4 and on the light-emerging side of the solid-state material 1. A clock generator 103 is provided, controlling the timing of applying pulsed light from the electro-optical modulator 9 and the timing of applying an electric field from the power supply 3 via the Al electrodes 2.

Figure 16:
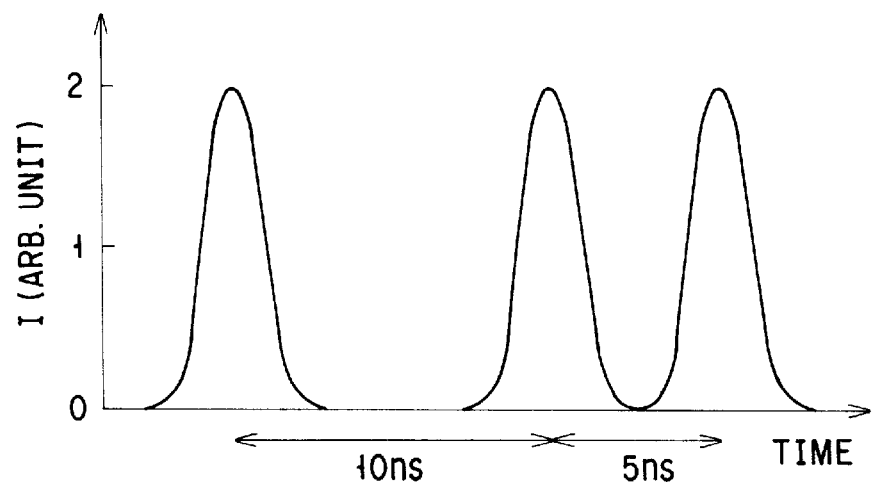
FIG. 16 is a diagram illustrating a pulse train recorded in Example 1.

The apparatus shown in FIGS. 13–15 operates, as described below, to record information in the solid-state material 1. At first, a coherent coupling beam having photon energy of 16404.2 cm$^{-1}$ adjusted to have a line width of about 500 kHz and a spot size of about 20 $\mu$m is applied to the solid-state material 1. This coupling light resonates with a transition between the levels $^3H_4$ and $^1D_2$ of $Pr^{3+}$ ions. Then, the light pulse train shown in FIG. 16 is applied to the solid-state material 1 at the very position where the coupling light is applied to. The photon energy of the pulsed light is 0.0025 cm$^{-1}$ higher than the photon energy of the coupling light. The pulse light has a pulse width of 2 ns.

The amount of pulsed light absorbed in the material 1 is about two-thirds (⅔) the amount which would be absorbed if no coupling light were applied to the solid-state material 1. This is because energy levels |a>, |c> and |d>, energy levels |a>, |c> and |e>, or energy levels |a>, |c> and |f> satisfy the condition for causing EIT, reducing the light absorption in the solid-state material 1. It is conceivable that the absorption does not disappear completely because of the following reason. Namely, at the temperature of 1.6 K, all three levels constituting a hyperfine structure in $^3H_4$ level have occupation number and can thereby contribute to light absorption when no coupling light is applied to the material 1. It appears that even if coupling light applied, only a part of the levels cause EIT, making it impossible to eliminate the light absorption completely.

At the time the light pulse train enters the solid-state material, a voltage of 25 V is applied to the electrodes 2, thereby performing recording.

After the information is recorded in the material 1, photon energies are scanned in the material 1, in a direction at right angles to the direction in which the light pulse train has been applied to the material 1, with varying the value energy 0.0002 cm$^{-1}$ near the photon energy of the coupling light, i.e., 16494.2 cm$^{-1}$. As a result, it is confirmed that there is a photon energy of which absorption by the material is enhanced. The photon energy $\omega_{AH}/(2\pi c)$ is thereby detected. This photon energy enhances the light absorption in the material 1, probably for the following reason.

When the electric field is applied to the solid-state material, the energy levels shift in the material, whereby the Pr$^{3+}$ ions not causing EIT absorb the light pulses. As the light pulses are absorbed, occupation numbers shift among the energy levels constituting a hyperfine structure, at the sites where the light pulses have been fixed. Therefore, the occupation number increases in the initial state, causing a transition which enhances the light absorption. Hence, a region in which the light absorption increases is observed in the absorption spectrum of the solid-state material 1.

Figure 17:
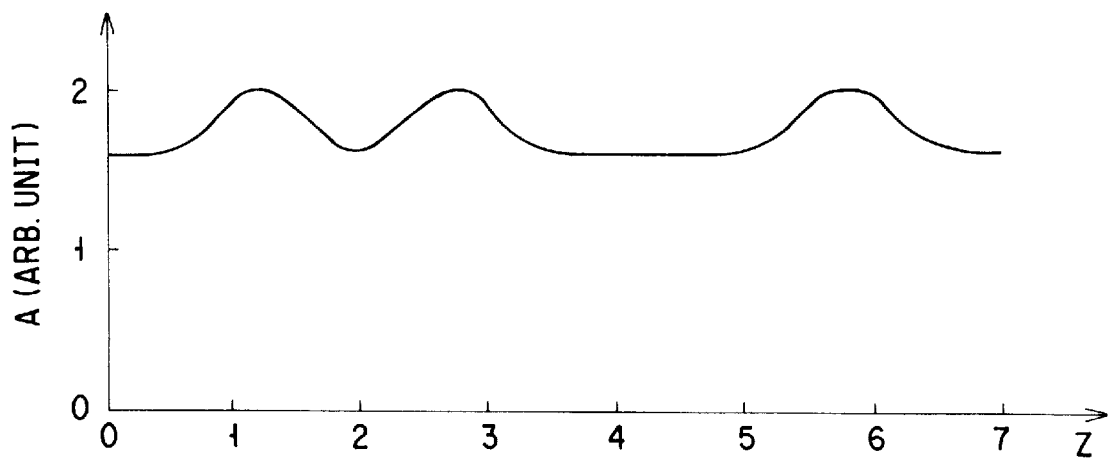
FIG. 17 is a graph depicting the spatial distribution of the light absorption in the solid-state material in which information has been recorded by Example 1.

Light having the photon energy $\omega_{AH}/(2\pi c)$ is applied to the material 1 in a direction at right angles to the direction in which the light pulse train has been applied, thereby measuring the absorbance in the z axis (i.e., thickness direction of material 1). Such results as shown in FIG. 17 are obtained. From these results it is confirmed that the light pulse train has been recorded in the solid-state material 1. The light pulses are fixed in the material 1, at intervals which are about 1/1000 shorter than the intervals in a vacuum. Namely, the light pulse train is recorded in the material 1, in an compressed state.

Light pulse train and coupling light beams may be applied to the solid-state material 1, at different positions in a plane perpendicular to the z axis of the material 1. Thus, the light pulse train can be recorded in-plane at a plurality of positions.

Example 2

It will be described how to reproduce information recorded in a solid-state material as sites where the absorption spectrum is varied.

Figure 18:
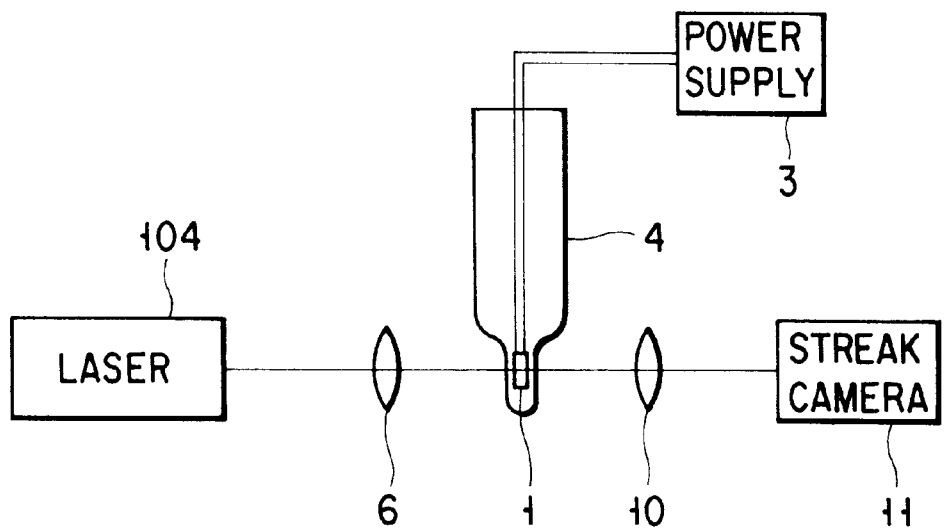
FIG. 18 is a block diagram showing the reproducing apparatus which is used in Example 2 of the invention.

FIG. 18 shows an apparatus for reproducing the information from a solid-state material 1. As in Example 1, the material 1 is a solid plate held in a cryostat 4 which has a quartz window. The cryostat 4 is filled with liquid helium 5, which cools the solid-state material 1. Al electrodes 2 deposited on the surface of the material 1 are connected to a power supply 3. A CW, ring dye laser 104 excited by argon ion laser is used as the source of reproduction light. A laser beam emitted from the laser 104 is converged by the convex lens 6, and then is applied to the solid-state material 1 held in the cryostat 4. A lens 10 and a streak camera 11 are provided outside the cryostat 4 and on the light-emerging side of the solid-state material 1.

Figure 19:
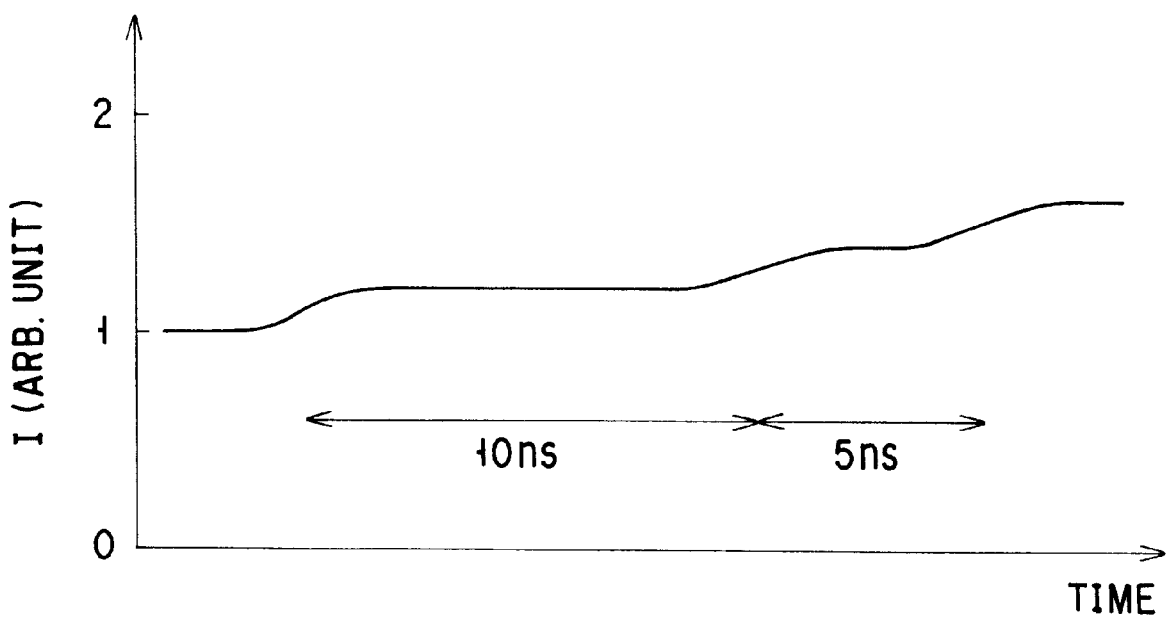
FIG. 19 is a graph depicting how the intensity of light passed through the solid-state material varies with time in Example 2.

How the apparatus reproduce the information from the solid-state material 1 in which light pulse train has been recorded as in Example 1 will be explained. At first, a voltage of 25 V with a fast rise time is applied between the Al electrodes 2 provided on the material 1, while reproduction light having photon energy of $\omega_{AH}/(2\pi c)$ and resonating with an absorption band where absorbance has increased is applied to the solid-state material 1, as in Example 1. The light which has emerged from the material 1 after the voltage is applied is converged by the lens 10, and then monitored by the streak camera 11, detecting the intensity (I) of the light. Such results as shown in FIG. 19 are obtained, probably for the following reason.

Figure 20A:
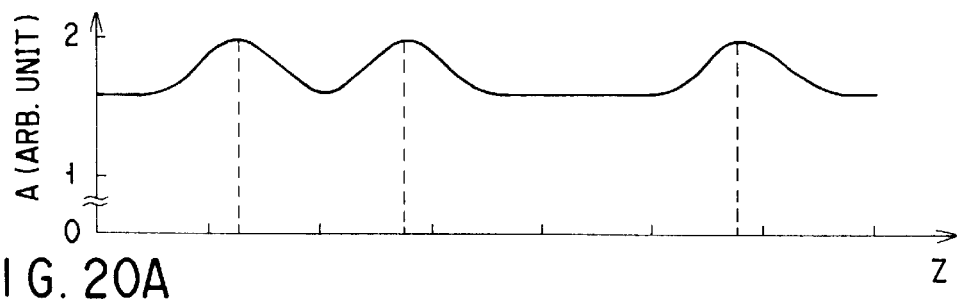
FIG. 20A is a graph illustrating the spatial distribution of absorbance in the solid-state material used in Example 2.
Figure 20B:
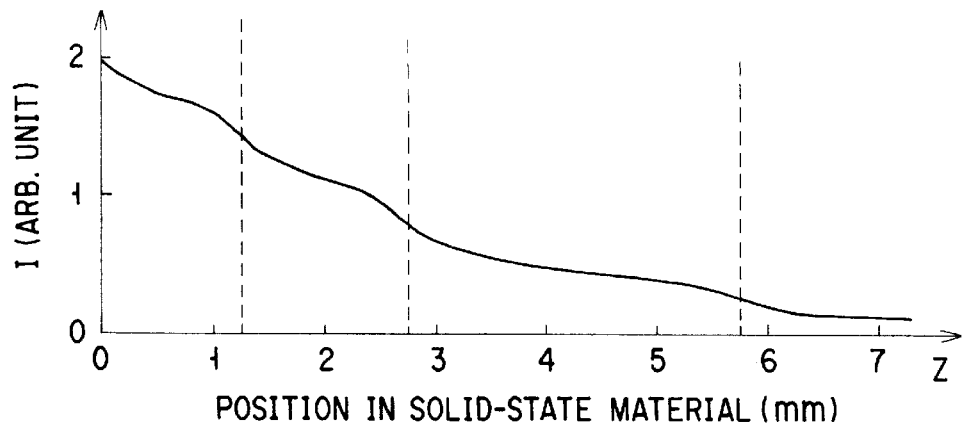
FIG. 20B is a graph depicting the spatial distribution of the intensity of light in the solid-state material used in Example 2.
Figure 21A:
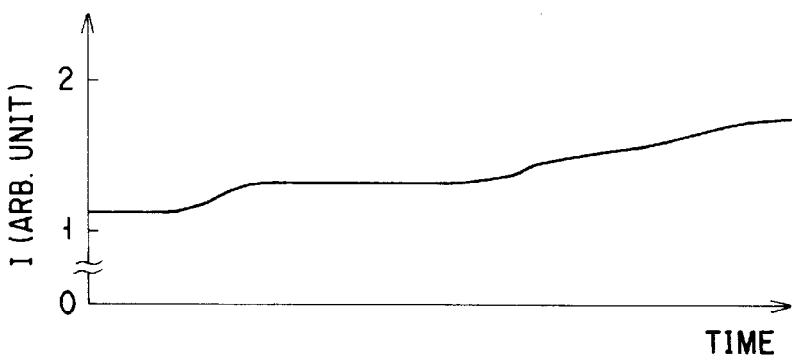
FIG. 21A is a graph showing how the intensity of light passed through the solid-state material varies with time in Example 2.
Figure 21B:
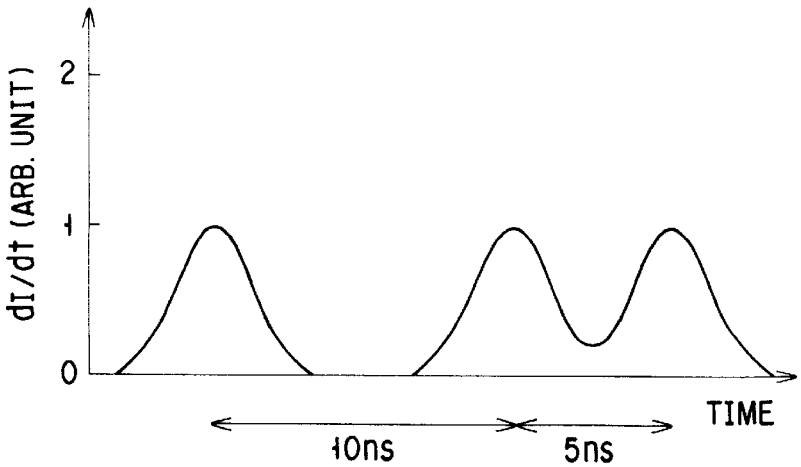
FIG. 21B is a graph illustrating the time derivative of the intensity of light passed through the solid-state material used in Example 2.

When the reproduction light having photon energy $\omega_{AH}/(2\pi c)$ is applied, the light absorption increases at the position where the information is recorded. Hence, the absorbance (A) in the material 1 changes as illustrated in FIG. 20A, and the intensity (I) of the light passing through the material 1 changes as shown in FIG. 20B. When an electric field is applied to the material 1 in this condition, the energy level shifts. The absorption band in which the absorbance has increased therefore moves out of a resonance region. As a result, the light emerges from the material 1 while the stepwise changes of light intensity are retained at the sites where the absorbance have increased. The intensity (I) of the light changes with time as is shown in FIG. 21A (corresponding to FIG. 19). Therefore, the light pulse train recorded in the material 1 can be reproduced by obtaining the time derivative of the light intensity (dI/dt).

The apparatus shown in FIG. 18 can be used to read out information from a solid-state material in which light pulse trains are recorded at positions in a plane perpendicular to the z axis by applying the reproduction light to the material, at different positions in a plane perpendicular to the z axis of the material.

Example 3

An apparatus for recording information in a disc medium made of YAG crystal having Pr$^{3+}$ ions dispersed in it will be described.

Figure 22B:
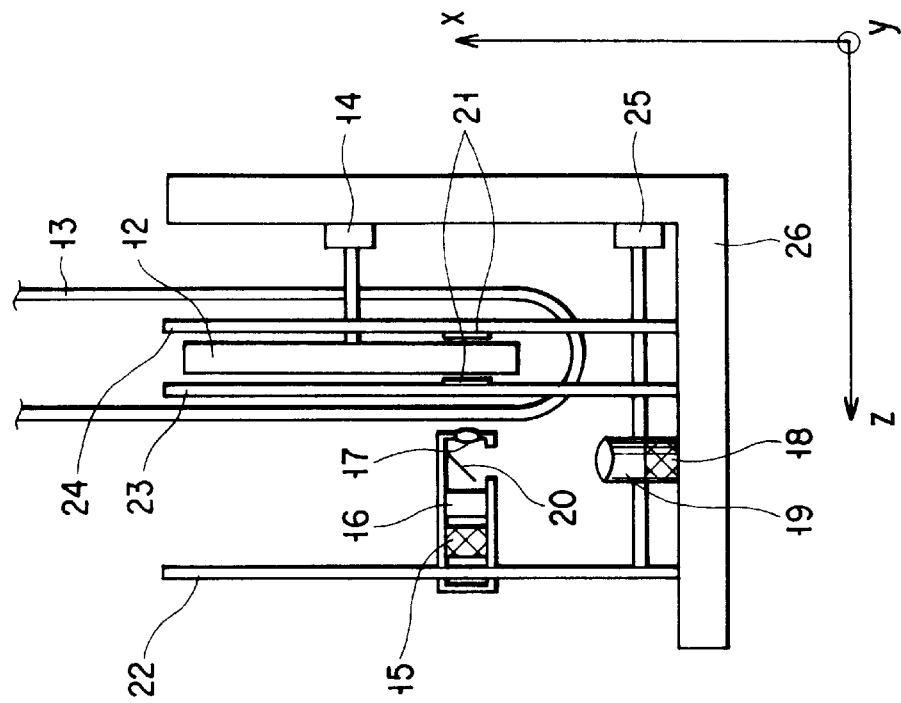
FIGS. 22A and 22B are front and side views of an information recording apparatus according to Example 3 of the invention.
Figure 22A:
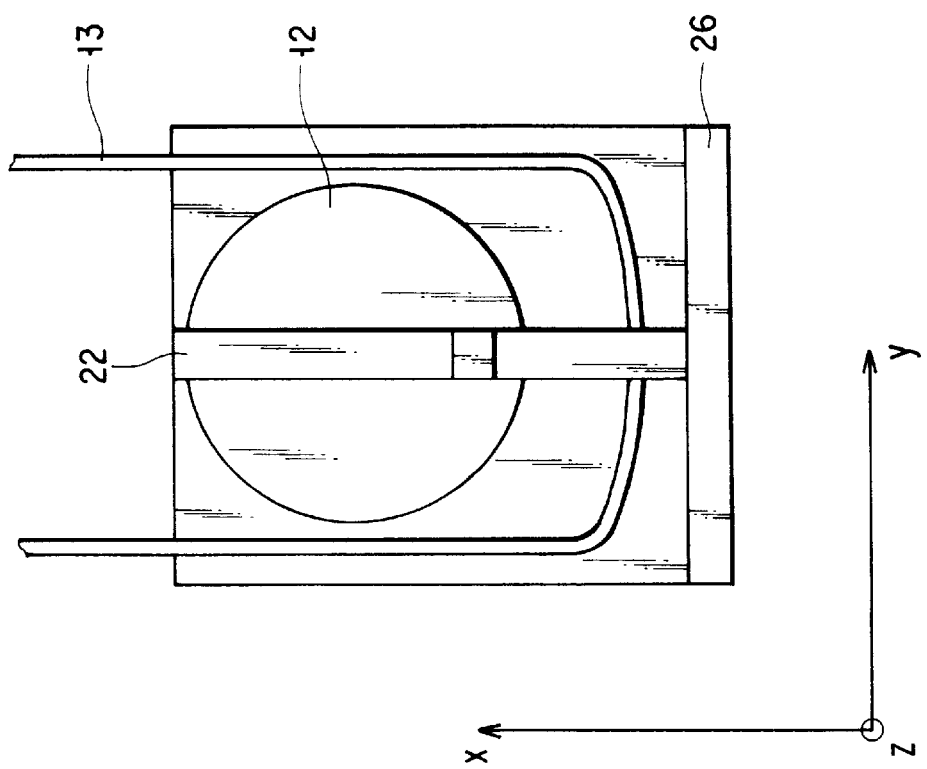

FIGS. 22A and 22B illustrate the apparatus according to Example 3. FIG. 22A is a front view, and FIG. 22B is a side view.

As shown in FIGS. 22A and 22B, a recording medium 12 is a disc which has a diameter of 100 mm and a thickness of 7 mm. The medium 12 is made YAG crystal having Pr$^{3+}$ ions dispersed in it. The medium 12 is held in a Dewar vessel 13 filled with liquid helium to be cooled. The medium 12 can be rotated by a stepping motor 14 located outside the Dewar vessel 13. A semi-conductor laser 15 and an electro-optical modulator 16 cooperate, generating a light pulse train, or recording light. The light pulse train is passed through a half mirror 20, is focused by a focusing lens 17 and is applied to the recording medium 12. A semiconductor laser 18 generates coupling light, which passes through a collimator lens 19 connected to the laser 18. A half mirror 20 reflects the coupling light, and the lens 17 focuses the coupling light. The coupling light thus focused is applied to the recording medium 12. The semiconductor laser 18 has an oscillation photon energy of 16404.2 cm$^{-1}$. The semiconductor laser 15 has an oscillation photon energy which is 0.0025 cm$^{-1}$ higher than that of the semiconductor laser 18. The recording position of the medium 12 is sandwiched between a pair of non-contact transparent electrodes 21. An electric field can therefore be applied to the recording position of the medium 12.

The semiconductor laser 15, electro-optical modulator 16, half mirror 20 and focusing lens 17 constitute an unit, which is attached to a guide rail 22. The transparent electrodes 21 are secured to two guide rails 23 and 24, respectively. The unit and the electrodes 21 can be moved in the x axis by means of a stepping motor 25. Above members are mounted on an aluminum base 26.

In the apparatus shown in FIG. 22A and 22B, a light pulse train is applied to a position (x, y) in the x-y plane of the recording medium 12, by driving the stepping motors 14, 25, and is recorded in the medium 12 in the z axis, that is, in the thickness direction. Then, a light pulse train is applied to another position (x', y') on the x-y plane of the medium 12 to perform recording. The unit is repeatedly so driven and light pulse trains are applied one by one to the medium, whereby information is recorded in the medium 12 in three-dimensional fashion, that is, in the x, y and z axes of the recording medium.

A variable wavelength semiconductor laser 18 may be used as the source of reproduction light, and a device for detecting the intensity of the light emerging from the medium 12 may be used as in the apparatus illustrated in FIG. 18. If so, the apparatus shown in FIGS. 22A and 22B can reproduce the information stored in the recording medium 12.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An optical recording medium made of a solid-state material having three energy levels in which the lowest energy level is referred to as a first energy level and the other energy levels are referred to as a second and a third energy levels, the material undergoes a change in absorption spectrum when irradiated with light comprised of photons having energy approximately equal to a transition energy between the first and the third energy levels, and retains said change in absorption spectrum after irradiation of the light is stopped.

2. A method of recording information in the optical recording medium as described in claim 1, said method comprising the steps of:
   applying to the optical recording medium a coherent light pulse train comprised of photons having energy approximately equal to a transition energy between the first and third energy levels and coherent light comprised of photons having energy approximately equal to a transition energy between the second and third energy levels or a transition energy between the first and second energy levels, thereby causing the light pulse train to pass through the optical recording medium; and
   supplying an intensity change of an external field to the optical recording medium, while the light pulse train is passing through the optical recording medium, thereby fixing sites in the thickness direction of the medium, at which the absorption spectrum is changed.

3. A method according to claim 2, wherein said light pulse train is superposed with information and is used as recording light.

4. A method according to claim 2, wherein said external field is an electric field.

5. A method according to claim 2, wherein said external field is a magnetic field.

6. A method according to claim 2, wherein a light pulse train is applied to the optical recording medium without applying an external field to the optical recording medium, and then an external field is applied to the optical recording medium while the light pulse train is passing through the optical recording medium.

7. A method of reproducing information from the optical recording medium as described in claim 1, said method comprising the steps of:
   supplying an intensity change of an external field to the optical recording medium, while light comprised of photons having energy approximately equal to a transition energy between a fourth energy level and fifth energy level, said fourth and fifth energy levels being respectively initial state and final state of a transition caused by light absorption occurring at a position of the optical recording medium, where the absorption spectrum has changed; and
   detecting changes in the intensity of light emerging from the optical recording medium after the intensity of the external field has been changed, thereby reproducing the information from the optical recording medium.

8. A method according to claim 7, wherein said external field is an electric field.

9. A method according to claim 7, wherein said external field is a magnetic field.

10. A method according to claim 7, wherein light is applied to the optical recording medium without applying the external field to the optical recording medium, and then the external field is applied to the optical recording medium.

11. A method according to claim 7, wherein a time derivative of the intensity of light emerging from the optical recording medium after the intensity of the external field has been changed.

12. An information recording apparatus comprising:
   first means for holding an optical recording medium as described in claim 1;
   second means for applying to the optical recording medium a coherent light pulse train comprised of photons having energy approximately equal to a transition energy between the first and third energy levels;
   third means for applying to the optical recording medium coherent light comprised of photons having energy approximately equal to a transition energy between the second and third energy levels or a transition between the first and second energy levels; and
   fourth means for applying an external field having a controlled intensity to the optical recording medium.

13. An apparatus according to claim 12, wherein said second means is a laser, and said third means is a laser.

14. An apparatus according to claim 12, further comprising means for controlling timing of applying the light pulse train to the optical recording medium and timing of changing the intensity of the external field applied to the optical recording medium.

15. An apparatus according to claim 12, wherein said fourth means comprises electrodes provided on both surfaces of the optical recording medium and a power supply connected to the electrodes.

16. An apparatus according to claim 12, wherein said fourth means comprises electrodes spaced apart from both surfaces of the optical recording medium and a power supply connected to the electrodes.

17. An apparatus according to claim 12, in which said first means holds the optical recording medium in a rotatable manner, and which further comprises a mechanism for simultaneously moving second means and electrodes spaced apart from both surfaces of the optical recording medium.

18. An information reproducing apparatus comprising:

first means for holding an optical recording medium as described in claim 1;

second means for applying to the optical recording medium light comprised of photons having energy approximately equal to a transition energy between fourth and fifth energy levels;

third means for applying an external field having a controlled intensity to the optical recording medium; and fourth means for detecting changes in an intensity of light emerging from the optical recording medium with time, said changes occurring as the intensity of the external field is varied.

19. An apparatus according to claim 18, wherein said second means is a laser.

20. An apparatus according to claim 18, wherein said third means comprises electrodes provided on both surfaces of the optical recording medium and a power supply connected to the electrodes.

21. An apparatus according to claim 18, wherein said third means comprises electrodes spaced apart from both surface of the optical recording medium and a power supply connected to the electrodes.

22. An apparatus according to claim 18, wherein said fourth means is a streak camera.

* * * * *

UNITED STATES PATENT AND TRADEMARK OFFICE
CERTIFICATE OF CORRECTION

PATENT NO.: 5,970,039

DATED: October 19, 1999

INVENTOR(S): Kouichi Ichimura et al.

It is certified that an error appears in the above-identified patent and that said Letters Patent is hereby corrected as shown below:

Claim 21, Column 16, line 11, "surface" should read --surfaces--.

Signed and Sealed this

Third Day of April, 2001

Attest:

NICHOLAS P. GODICI

Attesting Officer    Acting Director of the United States Patent and Trademark Office